(12) United States Patent
Stafford

(10) Patent No.: US 8,063,818 B2
(45) Date of Patent: Nov. 22, 2011

(54) CROSS-PRN PHASE CORRECTION FOR GPS PROCESSING

(75) Inventor: Stephen J. Stafford, Derwood, MD (US)

(73) Assignee: The Johns Hopkins University, Baltimore, MD (US)

(*) Notice: Subject to any disclaimer, the term of this patent is extended or adjusted under 35 U.S.C. 154(b) by 1049 days.

(21) Appl. No.: 11/936,280

(22) Filed: Nov. 7, 2007

(65) Prior Publication Data

US 2011/0037652 A1    Feb. 17, 2011

Related U.S. Application Data

(60) Provisional application No. 60/857,656, filed on Nov. 8, 2006.

(51) Int. Cl.
    *G01S 19/23* (2010.01)
    *G01S 19/24* (2010.01)
    *G01S 19/29* (2010.01)
    *G01S 19/30* (2010.01)

(52) U.S. Cl. ......... 342/357.62; 342/357.63; 342/357.68; 342/357.69

(58) Field of Classification Search ............ 342/357.63, 342/357.68, 357.69, 357.59, 357.62
See application file for complete search history.

(56) References Cited

U.S. PATENT DOCUMENTS

| | | | |
|---|---|---|---|
| 4,821,294 A | 4/1989 | Thomas | |
| 5,721,555 A * | 2/1998 | Lennen | 342/357.62 |
| 6,009,118 A | 12/1999 | Tiemann et al. | |
| 6,081,228 A * | 6/2000 | Leimer | 342/357.48 |
| 6,570,533 B2 | 5/2003 | Syrjarinne et al. | |
| 7,010,060 B2 | 3/2006 | Ledvina et al. | |
| 7,026,987 B2 | 4/2006 | Lokshin et al. | |
| 7,362,795 B1 * | 4/2008 | Lennen | 375/149 |
| 7,391,366 B2 * | 6/2008 | Park et al. | 342/357.59 |
| 2005/0151684 A1 * | 7/2005 | Hsu | 342/357.12 |
| 2007/0152878 A1 | 7/2007 | Wang et al. | |

OTHER PUBLICATIONS

Mark L. Psiaki, Block Acquisition of Weak GPS Signals in a Software Receiver; ION GPS 2001, Sep. 11-14, 2001, pp. 1-13; Salt Lake City, UT.

* cited by examiner

*Primary Examiner* — Gregory C Issing
(74) *Attorney, Agent, or Firm* — Albert J. Fasulo, II

(57) ABSTRACT

Methods and systems are provided for accessing GPS signals in faded environments. Means are provided for predicting the nonlinear phase induced by the receiver's own clock, when there is at least one GPS satellite link strong enough to calculate a phase profile. In an embodiment, GPS signals are accessed in faded environments by increasing the sensitivity of a GPS receiver by increasing the processing gain of received GPS signals through increased integration time. Matching a near-baseband signal requires removing a nonlinear part of the phase which may arise from several sources, including: the phase drift of the GPS satellite's atomic clock, the phase drift due to the motion of the GPS receiver, the phase drift due to the motion of the GPS satellite, and the phase drift due to the GPS receiver's clock.

25 Claims, 4 Drawing Sheets

CROSS-PRN PHASE CORRECTION FOR GPS PROCESSING

CROSS-REFERENCE TO RELATED APPLICATIONS

This application claims the benefit of prior filed U.S. application No. 60/857,656, filed on Nov. 8, 2006.

STATEMENT OF GOVERNMENTAL INTEREST

The invention was made with U.S. Government support under contract no. 2004-H009000-000. The U.S. Government has certain rights in the invention.

BACKGROUND OF THE INVENTION

1. Field of the Invention

The present invention relates generally to GPS processing and more particularly to GPS processing of GPS positioning signals in faded environments.

2. Description of the Related Art

There is a growing need for accessing GPS positioning signals in faded environments (e.g., indoors, below ground). The fades encountered can be more than 30 dB in some cases. The sensitivity of the GPS receiver must be increased commensurately to operate in these environments. Since high gain antennas cannot normally be used in these faded environments and lowering the noise figure can prove to be very expensive, the processing gain must be increased by increasing the integration time as much as possible. This requires that the phase profile of the near-baseband signal after GPS-message and code wipe-off will be matched. The linear part of the phase profile can be matched by trying multiple hypotheses, for phase rate, as with an FFT. With long coherent integration times, however, the nonlinear part of the phase profile will cause significant losses unless it is removed prior to inputting the signal to the FFT. The nonlinear part of the phase profile arises from several sources, the phase drift of the GPS satellite atomic clock, the phase drift due to the motion of the GPS satellite, the phase draft due to the motion of the GPS receiver and the phase drift due to the GPS receiver's clock. The non-linear phase caused by the phase drift of the GPS satellite's atomic clock is very small and does not become significant until the coherent integration time reaches about 10 seconds. For earth-fixed receivers, the nonlinear phase caused by the phase drift due to the motion of the GPS satellites is easy to remove given very approximate a-prior receiver position information. Several kilometers are adequate for integration times over one second. The requirement for this a-prior information can be eliminated by testing various hypotheses for receiver location. The nonlinear phase caused by phase drift due to the motion of the GPS receiver does not exist for receivers that are fixed or move at a constant velocity. There is usually no way to predict the nonlinear phase induced by the phase drift due to the GPS receiver's clock. The present invention addresses these concerns.

SUMMARY OF THE INVENTION

The present invention provides systems and methods for accessing GPS signals in faded environments. According to embodiments of the invention, access to signals in faded environments is performed, in a cost effective manner, generally by increasing the sensitivity of a GPS receiver. In the described embodiments, this is carried out in a GPS receiver by increasing the processing gain of received GPS signals through increased integration time. A preferred method for increasing the integration time is by increasing a coherent integration time to the maximum possible extent. This requires that the phase profile of a near-baseband signal is matched after removal of GPS-message and code wipe-off. However, to perform a matching of the near-baseband signal, it is first necessary to remove a nonlinear part of the phase which may arise from several sources. These several sources may include, for example, the phase drift of the GPS satellite's atomic clock, the phase drift due to the motion of the GPS receiver, the phase drift due to the motion of the GPS satellite and the phase drift due to the GPS receiver's clock. Subsequent to removing the nonlinear phase caused by the afore-mentioned several sources, a remaining part of the phase is assumed to be linear, assuming a constant receiver velocity.

According to one aspect of the invention, a method for accessing GPS signals in faded environments comprises the steps of: receiving a multiplexed GPS signal at a receiver; sampling said multiplexed GPS signal to produce a sampled multiplexed GPS data stream; storing a copy of said sampled multiplexed GPS data stream as a stored data GPS stream; identifying a constituent GPS signal in said sampled multiplexed GPS data stream having a signal strength sufficient for performing phase tracking; and producing a clock error phase corrected data stream by phase tracking said identified constituent GPS signal.

The inventor has recognized that if the phase profile of at least one satellite can be estimated, the nonlinear part resulting from the receiver's clock error can be extracted and removed from the near baseband signal for the other links before they are acquired.

BRIEF DESCRIPTION OF THE DRAWINGS

These and other objects, features and advantages of the invention will be apparent from a consideration of the following Detailed Description Of The Invention considered in conjunction with the drawing Figures, in which.

DETAILED DESCRIPTION

1. Introduction

Figure 1:
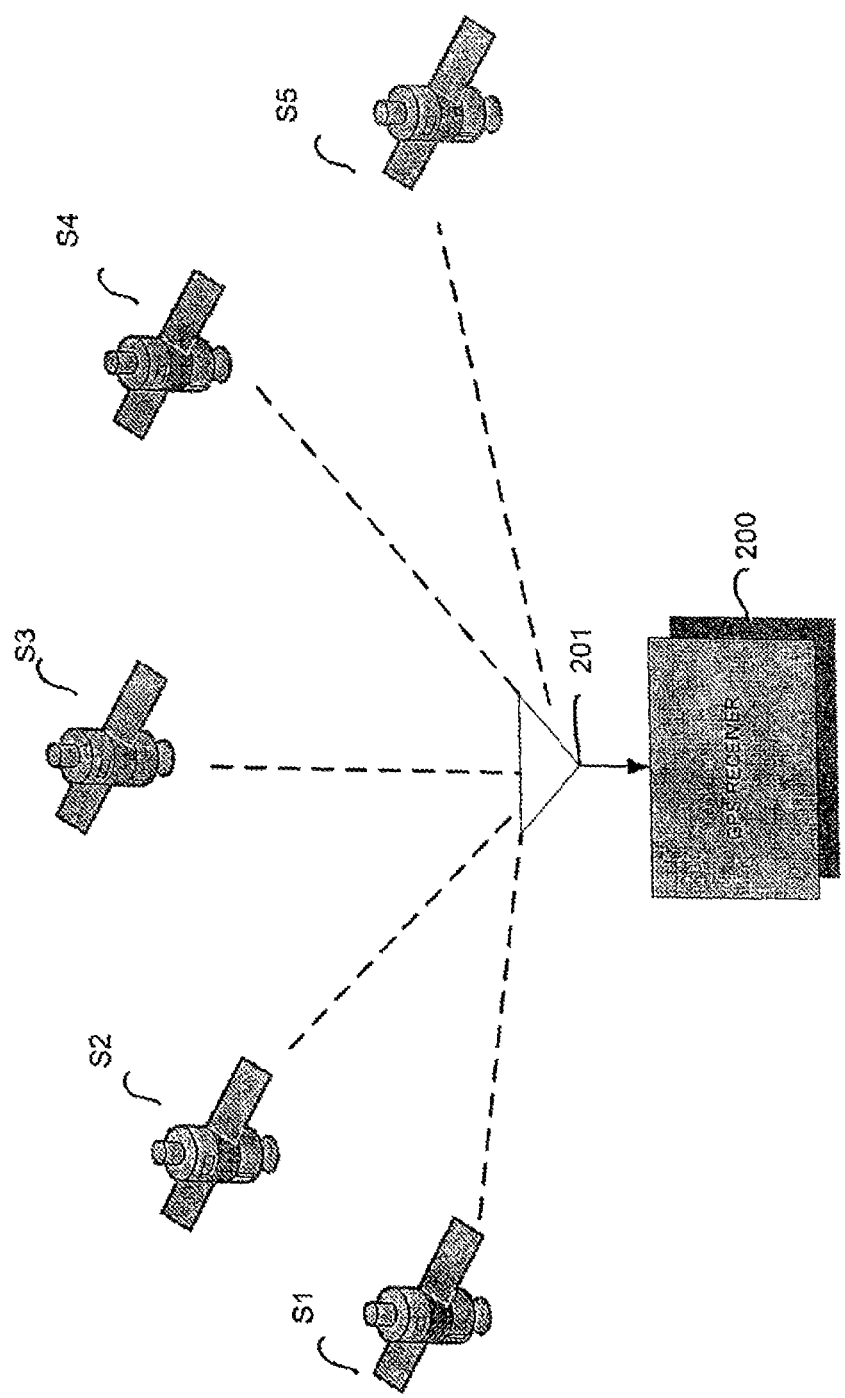
FIG. 1 is a perspective view of a GPS receiver including an antenna and five GPS satellites.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

1. System Overview

FIG. 1 is a perspective view of a GPS receiver 200 including an antenna 201 and, by way of example only, five GPS satellites (S1, S2, S3, S4, S5) in an exemplary network according exemplary embodiments of the present invention. The present invention pertains to correcting for a phase drift of the clock in the GPS receiver 20 by tracking the phase drift of a single GPS satellite from among the plurality of GPS satellites S1-S5.

With continued reference to FIG. 1, there is shown a plurality of GPS satellites S1-S5 with the range between each satellite and each GPS antenna (not shown) depicted by a dashed line. Incoming GPS signals, also known as pseudo random noise (PRN) signals, from a plurality of GPS satellites S1-S5 as a single multiplexed GPS signal is received at the GPS receiver's front-end. The GPS receiver converts the multiplexed GPS signal to a digital signal via downconversion and an analog-to-digital converter (not shown). The sampled signal is copied and stored for use at a later stage of processing. The original sampled signal is processed in a manner to be described below to produce a clock error phase corrected data stream by phase tracking a selected GPS signal contained within the multiplexed GPS signal. The selected signal being transmitted from one of the GPS satellites S1-S5 and selected on the basis of possessing sufficient signal strength for the purpose of performing phase tracking. It is understood that the techniques for design and construction of GPS antennas and RF front-ends that possess the characteristics relevant to the present invention are well known to those of ordinary skill in the art.

2. Signal Processing

Figure 2:
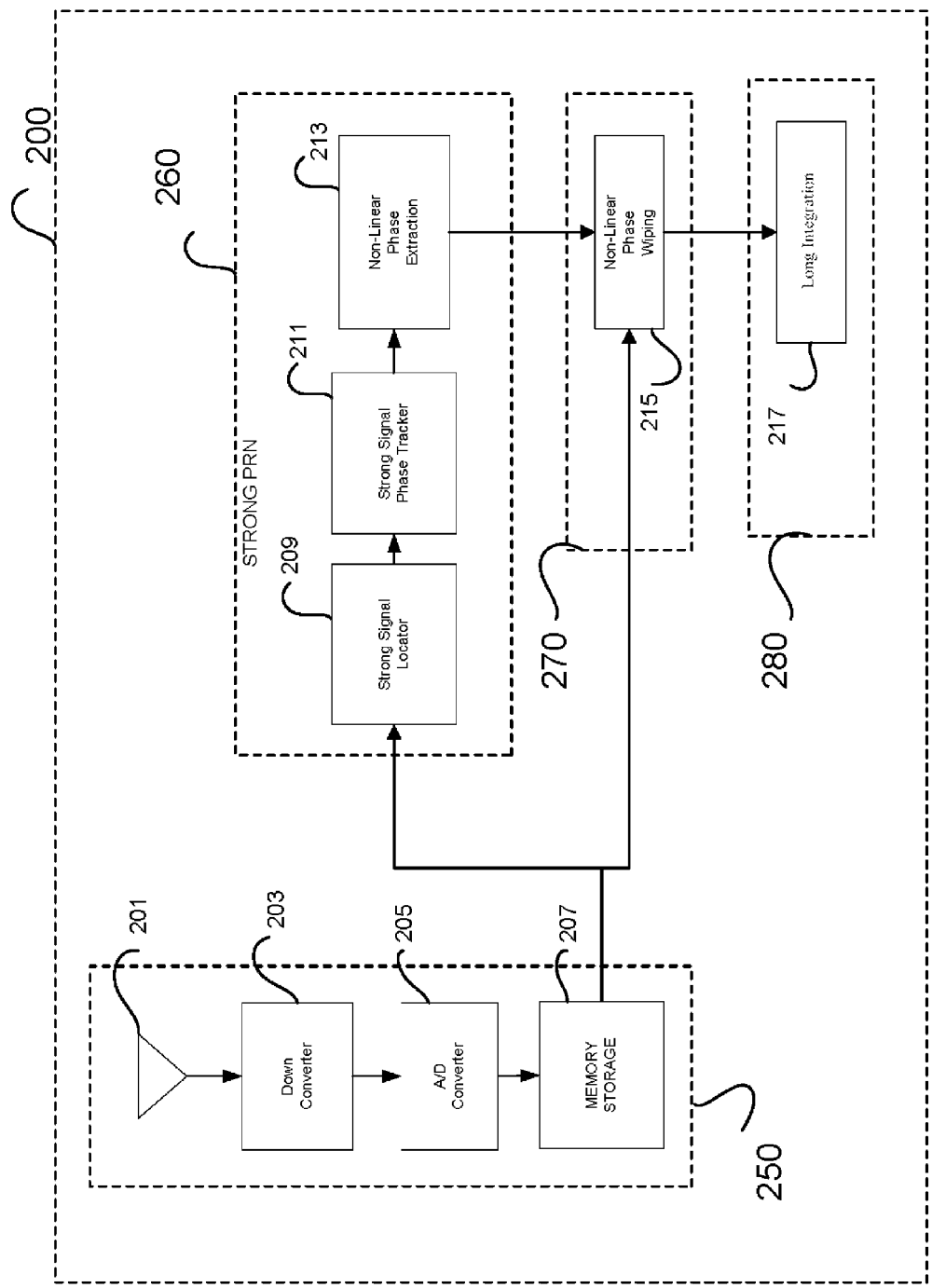
FIG. 2 is an illustration of a signal flow diagram 200 for performing Cross-PRN Phase Correction in the GPS receiver 20 of FIG. 1, according to one embodiment.

Referring now to FIG. 2 there is shown an illustration of a signal flow diagram 200 for performing a Cross-PRN Phase Correction, e.g., a correction of GPS satellite signals (PRNs) where one GPS signal is used to support the tracking of other GPS signals, in the GPS receiver 20 of FIG. 1, according to one embodiment. The flow diagram 200 is generally divided into four regions labeled 250, 260, 270 and 280. The respective region describes the signal flow associated with processing of a received GPS signal, e.g., PRN signal, for the purpose of estimating the phase profile of a strongest GPS signal to facilitate the acquisition of weaker received GPS signals.

Figure 3:
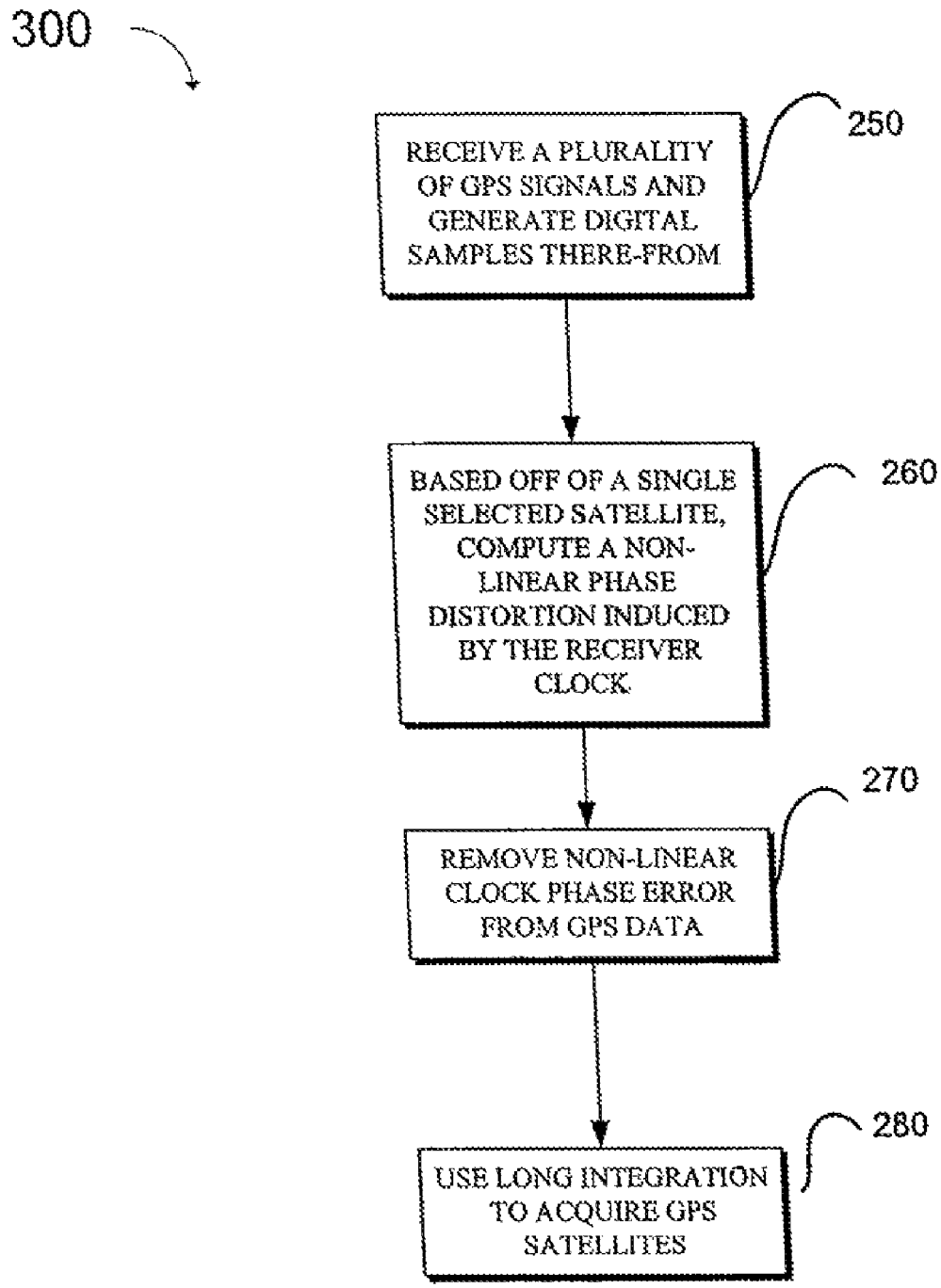
FIG. 3 is a top level flow chart 300 describing a method for performing Cross-PRN Phase Correction at a top level, according to one embodiment.

With reference now to FIG. 3, there is shown a top level flow chart 300 describing a method for performing Cross-PRN Phase Correction at a top level where each step of the top-level flowchart corresponds to an associated processing region of the signal flow diagram of the GPS receiver 20 of FIG. 2. For example, step 250 of the top level flowchart of FIG. 3 corresponds to processing region 250 of the signal flow diagram of FIG. 2. The flowchart of FIG. 3 is described as follows.

At step 250: A plurality of GPS signals are received from a corresponding plurality of GPS Satellites S1-S5 to generate a corresponding set of digital samples, via A/D converter 205, as shown in FIG. 2.

Next at step 260: Identify satellite with sufficient signal strength (e.g., S1) and track its phase. Remove the non-linear portion of the phase resulting from satellite accelerations from the tracked phase. Remove the non-linear portion of the phase resulting from receiver accelerations, if this information is available; otherwise, it is assumed the receiver has constant velocity. Also, remove linear component of from tracked phase, which corresponds to a frequency offset. The remaining phase function is a function of the receiver's clock drift.

Next at step 270: Remove the identified non-linear clock phase error from that GPS data to produce a receiver clock error phase corrected data stream.

Lastly, at step 280: Acquire the weaker satellite signals (e.g., S2-S5) using the clock corrected GPS data from step 270, and using standard long integration techniques, including message bit wiping when necessary.

Figure 4:
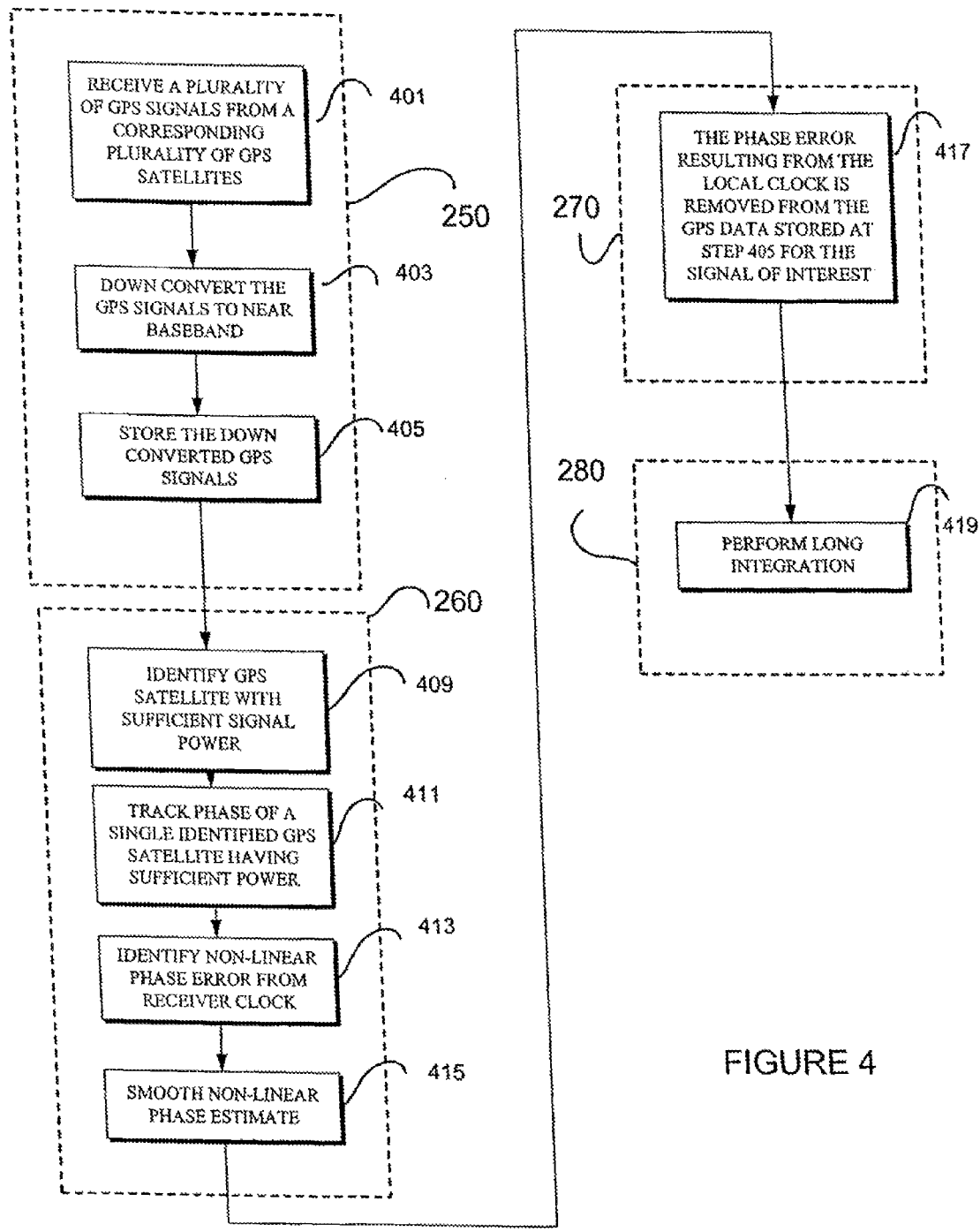
FIG. 4 is a more detailed flowchart describing the steps of the top level flowchart 300 of FIG. 3.

Referring now to FIG. 4, there is shown the detailed processing steps associated with each of the general processing steps 250-280 of the top level flowchart 300 of FIG. 3.

2.1 General Processing Step 250

Steps 401 through 405 are more detailed steps further describing general process step 250 of FIG. 3.

At step 401: A plurality of GPS signals are simultaneously received via an antenna 201 of GPS receiver 20 from a corresponding plurality of GPS satellites (S1-S5).

At step 403: The plurality of received GPS signals are down-converted and sampled to produce digitized samples of the near baseband complex envelope. In one embodiment, down-converting comprises the steps of, a mixing stage, a filtering stage, followed by complex sampling and filtering, with a sample rate of 4.2 MHz, and 2-bit quantization; a RAKON 5300B TCXO clock.

At step 405: A version of the near baseband signal is stored in a memory 207 for use at a later stage, described below at step 417. Examples of memory 207 include a Flash memory, a Random Access Memory (RAM) and a read only memory (ROM). In some embodiments upwards of 10 seconds of GPS data can be stored.

2.2 General Processing Step 260

Steps 409 through 415 are more detailed steps further describing general process step 260 of FIG. 3.

At step 409: Identify a satellite with sufficient signal strength to be phase tracked.

At step 411: Track the phase of the satellite identified at step 409, having sufficient signal strength. In some embodiments, this step may further comprise a bit-wiping operation when bits are present on a signal transmitted from the identified satellite.

At step 413: A phase component of the tracked signal is removed from the phase output from step 411. The phase component is comprised of two parts: (1) the non-linear phase due to the relative acceleration between said GPS satellite and the receiver and (2) a linear phase offset that removes the impact of any frequency errors in the output from 411. Assuming that the satellites atomic clock is linear over this region, the remaining (residual) phase function represents only the effect from the receiver clock.

At step 415: In practical embodiments, it may be desirable to smooth the result of step 413. In one embodiment, smoothing is performed using a discrete Kalman filter, with the Kalman filter having two states: phase and frequency.

2.3 General Processing Step 270

Step 417 is a more detailed steps further describing general process step 270 of FIG. 3.

At step 417: The phase error resulting from the local clock is removed from the GPS data stored from step 405. In one embodiment, removing the phase error comprises two steps: (1) interpolating the non-linear phase estimate from step 415 to coincide with the time points associated with that of the previously stored GPS data 207. (2), removing the phase values from the GPS data. An example of such a phase removal operation is given in the following equation, $x[k]e^{-j\theta_{CLOCK}[k]}$, where $\theta_{CLOCK}[k]$ is the non-linear phase estimate from step 415 interpolated to the previously stored GPS data sample times, and x[k] is the GPS data from 403.

2.4 General Processing Step 280

Step 419 is a more detailed step further describing general process step 280 of FIG. 3 pertaining to long integration. Long integration is well known in the art. One algorithm for performing long integration is described in Psiaki, M. L., "Block Acquisition of Weak GPS Signals in a Software Receiver," Proceedings of ION GPS 2001, September, 2001, incorporated by reference in its entirety, herein. In accordance with methods and systems of the invention, it is further contemplated to perform bit-wiping prior to performing a long integration.

There have thus been provided new and improved methods and systems for accessing GPS signals in faded environments. In accordance with the present invention, these methods and systems access GPS signals in faded environments by increasing the sensitivity of a GPS receiver. This is carried out in a GPS receiver by increasing the processing gain of received GPS signals through increased integration time. A preferred method for increasing the integration time, as described above, is by increasing a coherent integration time to the maximum possible extent. This requires that the phase profile of a near-baseband signal is matched after removal of GPS-message and code wipe-off. Matching the near-baseband signal requires the removal of a nonlinear part of the phase which may arise from several sources, including, the phase drift of the GPS satellite's atomic clock, the phase drift due to the motion of the GPS receiver, the phase drift due to the motion of the GPS satellite and the phase drift due to the GPS receiver's clock. Subsequent to removing the nonlinear part of the phase caused by the afore-mentioned several sources, a remaining part of the phase is assumed to be linear, assuming a constant receiver velocity.

Although the above description contains much specificity, these should not be construed as limiting the scope of the invention but as merely providing illustrations of some of the presently preferred embodiments of this invention.

Reference has been made mostly to the GPS signals but the techniques of present invention are equally applicable to other signals, such as, for example, American GNSS signals, Russian GLONASS and European GALILEO signals, ground and space-based augmentation signals, and other components of the GNSS in general.

While the invention has been described with reference to an example embodiment, it will be understood by those skilled in the art that a variety of modifications, additions and deletions are within the scope of the invention, as defined by the following claims.

What is claimed is:

1. A method of processing a plurality of global positioning satellite (GPS) signals in a faded environment, the method comprising:
    (a) receiving a multiplexed GPS signal at a receiver;
    (b) sampling said multiplexed GPS signal to produce a sampled multiplexed GPS data stream;
    (c) storing a copy of said sampled multiplexed GPS data stream as a stored data GPS stream;
    (d) identifying a constituent GPS signal in said sampled multiplexed GPS data stream, said constituent GPS signal having a signal strength sufficient for performing phase tracking; and
    (e) producing a receiver clock error phase corrected data stream by phase tracking said identified constituent GPS signal, said step of producing a receiver clock error phase corrected data stream comprising:
        removing known phase sources from a phase signal except a nonlinear phase source attributable to a receiver clock to produce a non-linear phase estimate of a non-linear clock error of said receiver clock; and
        correcting the stored data GPS stream using said non-linear phase estimate.

2. A method according to claim 1, wherein said receiver clock error phase corrected data stream is a cross-PRN clock error phase corrected data stream.

3. A method according to claim 1, further comprising a step of acquiring said plurality of GPS signals in said faded environment via long integration using said receiver clock error phase corrected data stream.

4. A method according to claim 3, wherein said step of acquiring said plurality of GPS signals via long integration comprises:

wiping message bits from the sampled multiplexed GPS data stream; and
compensating for code-phase distortion,
wherein said distortion is a fluctuation in code-phase resulting from a relative movement between a GPS satellite being acquired and the receiver.

5. A method according to claim 1, wherein said step of producing a receiver clock error phase corrected data stream further comprises the steps of:
tracking a multi-component phase of said identified constituent GPS signal in said sampled multiplexed data stream, thereby producing said phase signal; and
smoothing said non-linear phase estimate.

6. A method according to claim 5, wherein said tracking step further comprises the step of removing message bits from said identified data stream.

7. A method according to claim 5, wherein said known phase sources to be removed comprise at least one non-linear phase source attributable to one or more of an acceleration of said receiver and an acceleration of said identified satellite and at least one linear phase source attributable to a frequency bias.

8. A method according to claim 5, wherein said correcting step further comprises the steps of:
(a) interpolating a non-linear phase estimate to correspond to sample times of the stored GPS data stream; and
(b) removing phase values from the stored GPS data stream.

9. A method according to claim 1, wherein said multiplexed GPS signal received at said receiver is comprised of a plurality of GPS signals transmitted substantially simultaneously from a corresponding plurality of GPS satellites within a reception range of said receiver.

10. A method according to claim 1, further comprising down-converting said GPS multiplexed signal prior to said sampling step to produce a near base-band data stream.

11. A system for processing a plurality of GPS signals in a faded environment, the system comprising:
means for receiving a multiplexed GPS signal at a receiver;
means for sampling said multiplexed GPS signal to produce a sampled multiplexed GPS data stream;
means for storing a copy of said sampled multiplexed GPS data stream as a stored data GPS stream;
means for identifying a constituent GPS signal in said sampled multiplexed GPS data stream having a signal strength sufficient for performing phase tracking; and
means for producing a receiver clock error phase corrected data stream by phase tracking said identified constituent GPS signal, said means for producing a receiver clock error phase corrected data stream comprising:
means for removing known phase sources, from said phase signal except a non-linear phase source attributable to a receiver clock, thereby producing a non-linear phase estimate of a non-linear clock error of said receiver clock; and
means for correcting the stored GPS data stream using said non-linear clock phase estimate to produce said cross-PRN clock error phase corrected GPS data stream.

12. A system according to claim 11, further comprising means for acquiring said plurality of GPS signals in said faded environment using said receiver clock error phase corrected data stream.

13. A system according to claim 12, wherein said means for acquiring said plurality of GPS signals comprises:
wiping message bits from the sampled multiplexed GPS data stream; and
compensating for code-phase distortion, wherein said distortion is a fluctuation in code-phase resulting from a relative movement between a GPS satellite being acquired and the receiver.

14. A system according to claim 11, wherein said means for producing a receiver clock error phase corrected data stream further comprises:
means for tracking a multi-component phase of said identified constituent GPS signal in said sampled multiplexed data stream, thereby producing a phase signal; and
means for smoothing said non-linear phase estimate.

15. A system according to claim 14, wherein said means for tracking comprises removing message bits from said identified data stream.

16. A system according to claim 14, wherein said known phase sources to be removed comprise at least one non-linear phase source and at least one linear phase source.

17. A system according to claim 14, wherein said means for correcting the stored GPS data stream further comprises:
means for interpolating a non-linear phase estimate to correspond to sample times of the stored GPS data stream; and
means for removing phase values from the stored GPS data stream.

18. A system according to claim 11 , wherein said multiplexed GPS signal received at said receiver is comprised of a plurality of GPS signals transmitted substantially simultaneously from a corresponding plurality of GPS satellites within a reception range of said receiver.

19. A system according to claim 11, further comprising down-converting said GPS multiplexed signal prior to said sampling to produce a near base-band data stream.

20. A receiver for processing a plurality of GPS signals in a faded environment, the receiver comprising:
a radio frequency front-end that receives a multiplexed GPS signal from a plurality of satellites via an antenna;
means for sampling said multiplexed GPS signal to produce a sampled multiplexed GPS data stream;
means for storing a copy of said sampled multiplexed GPS data stream as a stored data GPS stream;
means for identifying a constituent GPS signal in said sampled multiplexed GPS data stream having a signal strength sufficient for performing phase tracking; and
means for producing a receiver clock error phase corrected data stream from said identified constituent GPS signal via said phase tracking means for acquiring said plurality of GPS signals in said faded environment using said receiver clock error phase corrected data stream, said means for producing a receiver clock error phase corrected data stream comprising:
means for removing known phase sources from said phase signal except a non-linear phase source attributable to a receiver clock , thereby producing a non-linear phase estimate of a non-linear clock error of said receiver clock; and
means for correcting the stored GPS data stream using said non-linear clock phase estimate to produce said cross-PRN clock error phase corrected GPS data stream.

21. A receiver according to claim 20, wherein said means for producing a receiver clock error phase corrected data stream further comprises:
means for tracking a multi-component phase of said identified constituent GPS signal in said sampled multiplexed data stream, thereby producing a phase signal; and means for
smoothing said non-linear phase estimate.

22. A receiver according to claim 21, wherein said means for tracking comprises removing message bits from said identified data stream.

23. A receiver according to claim 21, wherein said known phase sources to be removed comprise at least one non-linear phase source and at least one linear phase source.

24. A receiver according to claim 23, wherein said at least one non-linear phase source is attributable to one or more of an acceleration of said receiver and an acceleration of said identified satellite and at least one linear phase source is attributable to a frequency bias.

25. A receiver according to claim 21, wherein said means for correcting the stored GPS data stream further comprises:
  means for interpolating a non-linear phase estimate to correspond to sample times of the stored GPS data stream; and
  means for removing phase values from the stored GPS data stream.

\* \* \* \* \*